(12) United States Patent
Kothari

(10) Patent No.: US 9,457,642 B2
(45) Date of Patent: Oct. 4, 2016

(54) VEHICLE SUN VISOR WITH A MULTI-FUNCTIONAL TOUCH SCREEN WITH MULTIPLE CAMERA VIEWS AND PHOTO VIDEO CAPABILITY

(71) Applicant: Ankit Dilip Kothari, Henrico, VA (US)

(72) Inventor: Ankit Dilip Kothari, Henrico, VA (US)

(*) Notice: Subject to any disclaimer, the term of this patent is extended or adjusted under 35 U.S.C. 154(b) by 0 days.

(21) Appl. No.: 14/623,368

(22) Filed: Feb. 16, 2015

(65) Prior Publication Data

US 2016/0082888 A1 Mar. 24, 2016

Related U.S. Application Data

(60) Provisional application No. 62/052,475, filed on Sep. 19, 2014.

(51) Int. Cl.

| | |
|---|---|
| *H04N 7/00* | (2011.01) |
| *B60J 3/02* | (2006.01) |
| *B60R 1/00* | (2006.01) |
| *H04N 7/18* | (2006.01) |
| *B60R 11/02* | (2006.01) |
| *B60R 11/04* | (2006.01) |
| *B60R 11/00* | (2006.01) |

(52) U.S. Cl.
CPC ............... *B60J 3/0204* (2013.01); *B60R 1/00* (2013.01); *B60R 11/0235* (2013.01); *B60R 11/04* (2013.01); *H04N 7/181* (2013.01); *B60R 2011/0035* (2013.01); *B60R 2300/406* (2013.01); *B60R 2300/8006* (2013.01); *B60R 2300/8013* (2013.01)

(58) Field of Classification Search
CPC ............... B60R 2300/8026; B60R 2300/308; B60R 2300/8093; B60R 1/04; B60R 2011/0033; B60R 2011/0082; B60R 2300/105; B60R 2300/70; B60R 2300/8046; B60R 1/02; B60R 2011/0035; G08G 1/166; G08G 1/165; G08G 1/0175; G06K 9/00805

See application file for complete search history.

(56) References Cited

U.S. PATENT DOCUMENTS

| | | | |
|---|---|---|---|
| 2002/0003571 A1* | 1/2002 | Schofield | B60C 23/00 348/148 |
| 2006/0061008 A1* | 3/2006 | Karner | B29C 45/0017 264/250 |
| 2008/0239077 A1* | 10/2008 | Kurylo | H04N 7/18 348/148 |
| 2013/0088578 A1* | 4/2013 | Umezawa | G06T 7/0075 348/47 |

\* cited by examiner

*Primary Examiner* — Frederick Bailey
*Assistant Examiner* — Farhan Mahmud
(74) *Attorney, Agent, or Firm* — James M. Smedley LLC; James Michael Smedley, Esq.

(57) ABSTRACT

A vehicle sun visor system with a touch screen display is configured to display video feed from one or more cameras. A front facing polarized and/or photochromic camera shows the area of view which is normally blocked by the deployed sun visor, allowing the user to view traffic lights, road signs, etc. without the distraction of glare. Software image processing may also be used to reduce glare and improve visibility. In addition the sun visor system also has a "see-me" camera which allows the user to use the screen as a mirror, and one or more rear-view cameras which can be used to see the passenger area of a vehicle through the touch-screen display. Any of the cameras may be used to take photos or videos, which may be viewed on the display and transmitted wirelessly to other electronic devices or cloud storage.

28 Claims, 8 Drawing Sheets

VEHICLE SUN VISOR WITH A MULTI-FUNCTIONAL TOUCH SCREEN WITH MULTIPLE CAMERA VIEWS AND PHOTO VIDEO CAPABILITY

CROSS-REFERENCE TO RELATED APPLICATIONS

This application claims priority to U.S. Provisional Patent Application Ser. No. 62/052,475, entitled "Replace mirror on the vehicle's sun visor with multi-functional LED touch screen that displays multiple webcams and has photo video upload capability," filed on Sep. 19, 2014, the contents of which is incorporated herein in its entirety.

FIELD OF THE INVENTION

The present application relates to a vehicle sun visor system with a built-in touch screen display for viewing video feed from one or more cameras. A front facing polarized camera shows the area of view which is normally blocked by the sun visor when it is deployed. In addition the sun visor system also has a "see-me" camera which allows the user to use the screen as a mirror, and one or more rear-view cameras which can be used to see the passenger area of a vehicle through the touch-screen display.

BACKGROUND

Currently, the most sophisticated use of a vehicle sun visor involves nothing more than placing a vanity mirror on one side. When in use, current sun visors, while blocking out glare, eliminate a portion of the vehicle exterior from view, often forcing drivers to lift the sun visor in order to gain visibility of traffic lights or road signs ahead. Also, the currently existing mirrors on the vehicle's sun visors only display the person sitting inside the vehicle in front of that sun visor. However, such existing sun visor mirrors don't display the opposite direction i.e. view external to the vehicle, or in other words, view in front of the vehicle. Also, as mentioned above, the existing sun visor mirrors don't display any other passengers that aren't visible in the direct view i.e. in front of that sun visor. In addition, the existing sun visor mirrors also don't have the ability to take photos/videos and be able to upload them to a central location. Here are some scenarios that further explain these shortcomings of the existing sun visor mirrors.

There are many people who pull down the vehicle's sun visor to either avoid the bright sunlight during the day or to avoid the glare coming from other vehicles during the night. However, when such people are either driving or waiting in their vehicles, either during the day or the night, with their sun visor down, and if they wanted to see the traffic light, informational boards, street names, or other similar information, which is usually posted higher up, then those people often have to get that external information either by looking from the sides of their sun visor or sometimes even have to pull up their sun visors altogether to access that external information. In this case, since the currently existing mirrors on the vehicle's sun visors only display the view inside the vehicle and not the opposite direction i.e. the view external to the vehicle, so the existing mirrors on the sun visors don't help, and therefore, the vehicle's passengers often have to look at the bright sunlight or the glare in order to access the external information that's usually displayed higher up on the roads.

Since the existing sun visor mirrors also don't intend to display any other passengers except the person sitting in front of that sun visor, an individual who wants to look at the other passengers, especially the rear passengers, either has to look using special curved mirror that's usually located in the center of the vehicle, or turn around, or even move up and down their seat in order to create a correct angle for being able to view the other passengers using their vehicle's sun visor or the central rear view mirror. In short, the existing sun visor mirrors don't provide an easy way to be able to view the other passengers that might be sitting in the vehicle.

Also, the existing sun visor mirrors don't have the ability to take photos/videos of the passengers or to upload those photos/videos to online albums using built-in Wi-Fi, cellular, or to share those photos/videos with another device like smartphone, computer, etc. using Bluetooth. Many people spend a lot of time travelling and usually there are very minimal photos/videos taken during their travel in the vehicle. Since the existing mirrors don't have this feature to take photos/videos for the passengers sitting in the vehicle, those travelling moments are often never captured.

BRIEF SUMMARY

Accordingly, it is an object of the present invention to provide a sun visor device which allows the user to see the area around the vehicle which is blocked when the sun visor is deployed with polarization or glare reduction.

According to an embodiment of the present invention, an automotive visualization system comprises: a first camera, a display apparatus placed within view of a user of the vehicle, a computer processor, non-volatile computer memory storing computer instructions configured to: receive a first image from the first camera, display the first image on the display apparatus in real time, and a switching mechanism configured to cause the display apparatus to turn on and/or off in response to the switching mechanism.

According to an embodiment of the present invention, the first camera is placed in a position that faces toward the front of a vehicle.

According to an embodiment of the present invention, the first camera is positioned in a vehicle sun visor such that, when the sun visor is deployed, the camera faces toward the front of the vehicle.

According to an embodiment of the present invention, the display apparatus is a display screen and the display screen is mounted on or configured to be mounted on a vehicle sun visor such that when the sun visor is deployed, the display screen faces toward a user of the sun visor.

According to an embodiment of the present invention, the automotive visualization system further comprises: a rechargeable battery, and a housing configured to contain the first camera, the display apparatus, the computer processor, and the non-volatile computer memory in the form factor of a tablet PC, wherein the housing is configured to be detachable from the vehicle sun visor.

According to an embodiment of the present invention, the automotive visualization system is configured to interface with a Head Up Display, wherein the computer instructions are further configured to: send the front image for display on the Head Up Display, turn off the display apparatus when the Head Up Display is in use, and turn on the display apparatus in response to a user action in order to receive additional user inputs.

According to an embodiment of the present invention, the computer instructions are further configured to keep the display apparatus on, while the Head Up Display is in use, in response to a predetermined user input.

According to an embodiment of the present invention, the first camera produces a front image that is a polarized front image.

According to an embodiment of the present invention, the automotive visualization system further comprises a photochromic lens.

According to an embodiment of the present invention, the computer instructions are further configured to: process the front image to remove glare.

According to an embodiment of the present invention, the automotive visualization system further comprises: a second camera placed in a position that faces toward a user of a vehicle sun visor, wherein the display is configured to display a user image of the user, produced by the second camera, in response to a command entered by the user. The automotive visualization system of claim 11 wherein the computer instructions are further configured to capture images produced by the first camera and/or the second camera.

According to an embodiment of the present invention, the automotive visualization system further comprises: a microphone; and the computer instructions are further configured to record video produced by the first camera and/or the second camera and capture audio produced by the microphone.

According to an embodiment of the present invention, the computer instructions are further configured to automatically transfer captured images to another location over a wireless connection.

According to an embodiment of the present invention, the computer instructions are further configured to automatically delete the captured images that have been transferred to another location.

According to an embodiment of the present invention, the computer instructions are further configured to provide a graphical user interface in a display area of the display apparatus, the graphical user interface comprising: a camera image viewing region centrally located in the display area, a view selection region, displayed on a first side of the display area, for selecting among the views produced by the cameras of the system, and a user action region, displayed on a second side of the display area, made up of one or more user action areas comprising: a user action area for capturing images, a user action area for viewing captured images, a user action area for accessing system settings, and a user action area for adjusting brightness.

According to an embodiment of the present invention, the automotive visualization system further comprises: one or more rear cameras placed in a position that faces a rear passenger seat of the vehicle, and the display apparatus is configured to display a rear view produced by the one or more rear cameras, in response to user input.

According to an embodiment of the present invention, the computer instructions are further configured to capture images and/or video produced by the first camera and/or at least one of the one or more rear cameras.

According to an embodiment of the present invention, the display apparatus is configured to: display multiple rear views in a split view mode displaying each of the multiple rear views in a separate section of the display apparatus simultaneously; and the computer instructions are further configured to switch to an enlarged view of one of the multiple rear views in response to user input.

According to an embodiment of the present invention, the computer instructions are further configured to: adjust focus and/or zoom of at least one of the one or more rear cameras in response to user input.

According to an embodiment of the present invention, the computer instructions are further configured to: save a focus and/or zoom level as a default camera setting, wherein a separate default camera setting is stored for each of the one or more rear cameras, and wherein the default camera setting is used each time the rear view of the camera to which the default camera setting belongs is displayed.

According to an embodiment of the present invention, an automotive audio visual system comprises: a housing; a first camera positioned on a first side of the housing; a display apparatus on a second side of the housing; a computer processor; non-volatile computer memory storing computer instructions configured to: receive a first image from the first camera, display the first image on the display apparatus in real time; and a switching mechanism configured to cause the display apparatus to turn on and/or off in response to the switching mechanism, wherein the housing is mounted or configured to be mounted on the ceiling of a vehicle.

According to an embodiment of the present invention, the automotive audio visual system further comprises: a second camera positioned on the second side of the housing, a microphone, and wherein the computer instructions are further configured to: receive a second image from the second camera, and display the second image on the display apparatus in real time.

According to an embodiment of the present invention, the automotive audio visual system further comprises: a second camera positioned elsewhere in or on the vehicle, an external camera interface to interface with the second camera, and wherein the computer instructions are further configured to: receive a second image from the second camera, and display the second image on the display apparatus in real time.

According to an embodiment of the present invention, the first camera is configured to produce a polarized first image.

The illustrated embodiments of the invention includes an apparatus of an audiovisual system, either built-in or retrofitted to a vehicle sun visor, allowing the driver and front passenger to regain visibility of the portion of the vehicle's external environment blocked from view when the sun visor is in use. This audiovisual system is alternatively referred to as an automotive visualization system. It also enables them to digitally view themselves and rear passengers, and also other additional camera views can be integrated or interfaced with the system. In addition, it also enabled them to take and upload videos and images of vehicle's internal and external environment by manipulating and communicating with a system of cameras from a tablet-like touch screen device that's built-in or retrofitted on the vehicle sun visors.

While the illustrated embodiments are primarily directed as original built-in equipment on a vehicle sun visor, it is within the spirit and scope of the invention to be able to retrofit the disclosed apparatus on existing vehicle sun visors as well.

The illustrated embodiments of the invention not only adds audiovisual systems on the vehicle's sun visors but also returns visibility to the portion of the vehicle environment that is blocked by use of the sun visor. It allows the user to not only view things in the vehicle's external environment that would be otherwise blocked by the sun visor, but also to enhance that view by using glare reduction and other image processing tools. In addition, it also allows the user to digitally view themselves and the rear passengers, and also other additional camera views can be integrated or interfaced with the system (For example: 'Rear polarized view' camera can also be displayed on the sun visor's LCD touch screen, so when the vehicle is being reversed, it would display the rear view of the vehicle on the sun visor's LCD touch screen, and that view would also be auto polarized and auto photochromic.) Moreover, it also allows the user to capture and store video and images, both within the vehicle and in the vehicle's external environment, allowing users to memorialize their trips.

Finally, the sun visor provides a convenient center for control and manipulation of such a system, allowing a driver to easily view both the external environment and interior of the vehicle by manipulating conveniently placed controls without turning or struggling with the sun visor thereby minimizing distractions during driving.

The invention is comprised of three major elements: a tablet like device containing a touch screen, a computer programmed to communicate with and display images/video, and a system of cameras placed within and/or outside the vehicle. The tablet like touch screen device is built-in or retrofitted to the vehicle's sun visors. Multiple cameras, either embedded on the sun visors' touch screen device itself or placed at different locations in the vehicle, allows to capture different views comprising the following: a "polarized front" view, which is the view of the external environment in front of the vehicle, a portion of which is usually hidden while the sun visor is in use; a "see me" view, which is the view of the person seated in the vehicle directly in front of the sun visor; and a "rear passengers" view, which is the view of passengers seated on the back seats of the vehicle; and there can also be other additional cameras that can be integrated or interfaced with this system (For example: 'Rear polarized view' camera can also be displayed on the sun visor's LCD touch screen, so when the vehicle is being reversed, it would display the rear view of the vehicle on the sun visor's LCD touch screen, and that view would also be auto polarized and auto photochromic.) The tablet like touch screen device contains software modules enabling the user to switch between cameras, zoom-in on certain portions of the displayed camera views, take and view images/videos, delete stored images/videos, enhance the images displayed, auto share images/videos with other devices, auto upload images/videos to online services and auto delete images/videos by simply manipulating controls and settings displayed on the touch screen.

In summary, the illustrated embodiments can now be understood to include an audiovisual monitoring system on a vehicle sun visor comprising: a "polarized front" view camera configured to capture view of a vehicle's external environment, a portion of which is typically blocked when the sun visor is in use; a "see me" view camera configured to capture view of the person sitting in front of the sun visor; a "rear passengers" view camera or a set of such cameras configured to capture view of the passengers sittings in the back seats of the vehicle; other potential camera views, a computer communicating with and controlling the cameras; and a tablet like LCD touch screen device electronically communicated to the computer and displaying the views captured by the cameras.

The computer is controlled by software allowing a user to communicate to the computer by manipulating controls appearing on the touch screen.

The computer is controlled by software allowing a user to direct the computer to selectively display a view from either the polarized front view, see me, or rear passengers view cameras onto the LCD touch screen.

The audiovisual monitoring system further includes a memory for capturing an image and/or video from the polarized front view, see me, or rear passengers view cameras.

The computer includes a software module therein for selectively controlling touch screen brightness.

The computer includes a software module therein for selectively generating a "Take Photos/Videos" control signal directed to a selected camera.

The computer includes a software module therein for selectively generating a "Save Settings" control signal directed to each camera.

The computer includes a software module therein for generating a "Reset Settings" control signal directed to each camera.

The computer includes a software module therein for selectively generating a zoom in/out control signal directed to the selected camera.

The computer includes a software module therein to enable/disable connectivity features like Wi-Fi, Bluetooth, Cellular, etc.

The computer includes a software module therein for generating an "auto upload/share" signal for the photos/videos stored on the sun visor's LCD touch screen device.

The computer includes a software module therein for generating an 'Auto delete after share/upload' signal for the photos/videos stored on sun visor's LCD touch screen device.

The computer includes a software module therein to allow the user to set the 'Default webcam/camera' view, which would be displayed whenever the sun visor's LCD touch screen is turned on.

The computer includes a software module therein to automatically turn on the sun visor's LCD touch screen display when the sun visor cover is pulled up/opened and automatically turn off the sun visor's LCD touch screen display when the sun visor cover is pulled down/closed.

The "polarized front" view camera includes a lens therein that is both auto-polarized and auto-photochromic, and there would also be software modules present on computer that can apply the polarization and photochromic effects.

The audio visual monitoring system further includes a vehicle head-up display (HUD) system, and wherein the computer includes a software module for communicating with the vehicle head-up display (HUD) system. (Note: Purpose of the head-up display (HUD) system is to project information ('camera views', photos/videos, etc.) on the windshield of the vehicle. In some cases, even a special glass is used on the windshield, so the projected information from the 'HUD display' seems to be further away i.e. after the hood of the vehicle, avoiding any distraction for the driver.)

The computer includes a software module enabling a camera view that's displayed on the sun visor's LCD touch screen or the stored photos/videos on the sun visor's LCD touch screen to be displayed on the head-up display (HUD) system. This functionality would allow the users to keep looking straight on their windshield itself, and they would not have to look at the sun visor's LCD touch screen display for different camera views or the stored photos/videos.

The computer includes a software module that selectively shuts down the sun visor's LCD touch screen after a predetermined time period while the HUD system is activated.

The computer includes a software module therein to manually turn on the sun visor's LCD touch screen, after it's shut down due to activation of the HUD system, by tapping on that sun visor's LCD touch screen with a finger/hand.

(Note: In this case, the sun visor's LCD touch screen would turn on for a predetermined short time period and then turn off again.)

The computer includes a software module therein to keep the sun visor's LCD touch screen display continuously turned on, while the HUD display is already on, by pressing continuously on the sun visor's LCD touch screen for a predetermined time period.

The tablet like LCD touch screen device on the sun visor includes the 'Polarized front view' camera on the device itself, 'See me' camera on the device itself, an on/off switch to either turn on or turn off the touch screen display, a speaker for playback of stored videos, a volume control to increase or decrease the volume for playback of any stored videos, a headphone jack for individual listening to audio of any stored videos, a microphone for recording the audio in the videos, and an Audio/video out/Digital terminal that would allow the user to connect to a computer using a USB data cable and transfer any photos/videos stored on the sun visor's LCD touch screen device. Note: The above mentioned features on the sun visor's LCD touch screen device are just for exemplary purposes, however, as technology advances in future, additional ports and/or options can be added to this LCD touch screen device to enhance the use of these devices.

The system described above would continue to work/function even when the vehicle isn't turned on i.e. the sun visor's LCD touch screen device would run using its built-in rechargeable battery in this case, and battery symbol would be displayed on its LCD touch screen to indicate the amount of remaining battery.

The tablet like LCD touch screen device on the sun visor would be detachable, so any of the audio visual monitoring system functions while attached to the vehicle's sun visor would also continue to work while the LCD touch screen device is detached. Note: While detached, the sun visor's LCD touch screen device would continue to work using its built-in rechargeable battery, and battery symbol would be displayed on its LCD touch screen to indicate the amount of remaining battery.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION

Figure 1:
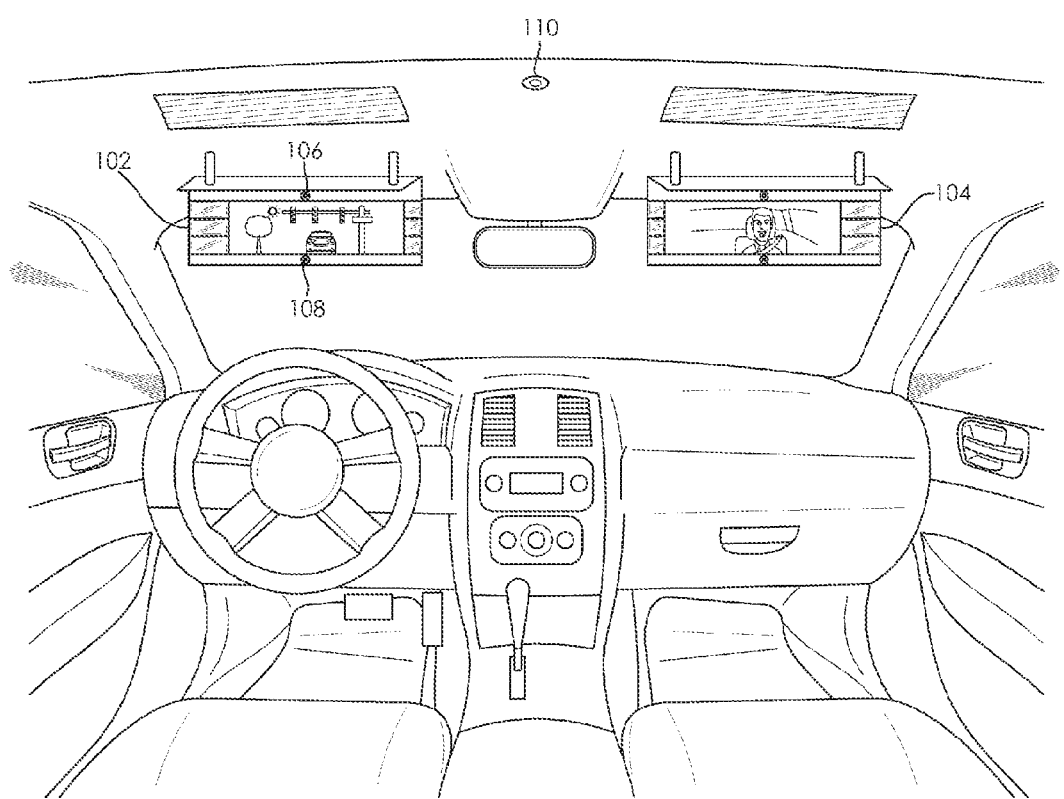
FIG. 1 is a diagram which illustrates the multi-functional LCD touch screen device built into both the driver side and the front passenger side sun visors, which would replace the existing sun visor mirrors. In addition, it also illustrates the exemplary locations of the cameras that would be installed for the 'Polarized front view', 'See me view' and the 'Rear passengers view'.

As shown in FIG. 1, this solution would replace the mirror on the vehicle's sun visor with multi-functional LCD touch screen device 102, 104. Each of those LCD touch screen devices would have multiple built-in cameras 106, 108 and an interface to external cameras 110, ability to display any of those camera views, ability to take pictures and videos and later view those on LCD touch screen, ability to share those photos/videos with another device or upload them to central location, and using auto polarization and auto photochromic lens on a camera as well as using software module an ability to auto-reduce the glare or bright light, so the objects (for example: traffic lights) can be clearly visible on screen. Even for those vehicles that currently don't have an existing mirror on their sun visors, this solution would add a multi-functional LCD touch screen display on those sun visors too. (Note: the size of the LCD touch screen display can either be the full size of the sun visor or can even be a small portion of that sun visor.)

According to an embodiment of the present invention, the camera has a polarized lens which allows the camera to capture a polarized image. Alternatively the camera may have a polarized image sensor, or a polarizing filter may be affixed to the vehicle windshield or a polarizing film may be applied over the lens of the camera. One or ordinary skill in the art would recognize that any method of polarizing the image captured by the camera could be used to achieve polarization without departing from the spirit and scope of the present invention.

It is to be clearly understood that either a single LCD touch screen device or a plurality of such devices built in or affixed to one or more sun visors and communicated with one or more of the cameras is also within the scope and spirit of the invention. Also, it is to be clearly understood that either a single or plurality of sun visors with LCD touch screens can exist in any part of the vehicle i.e. front, back, right, left or top side of the vehicle, and that's within the scope and spirit of the invention. Please note that depending upon the side of the vehicle where the sun visor exists, some functionalities or camera views on the sun visor's LCD touch screen devices might be different. For example: rear seat sun visors might not display the 'rear passengers' camera view, instead it might display the front seat passengers using one or more 'front passenger' cameras.

For reference, FIG. 1 also provides an illustrative interior view of a vehicle containing the sun visor's visual system, including the other components of the vehicle like steering wheel, center console, gear shifter, dashboard with dashboard accessories, rear-view mirror, and front windshield.

According to an embodiment of the present invention, one or more rear passenger view cameras may be placed elsewhere in the vehicle and interface with the sun visor device through a standard external camera interface, the external camera interface may be wired or wireless. A wired external camera interface may be USB, Firewire, a proprietary camera interface, or any other kind of interface. A wireless external camera interface may be Bluetooth, Wi-Fi, Zigbee, or any other standard or proprietary wireless communication protocol. One or ordinary skill in the art would recognize that any external camera interface may be used without departing from the spirit and scope of the present invention.

According to an embodiment of the present invention, throughout this specification the invention described herein may be referred to as a computer, system, sun visor device, automotive visualization system interchangeably. The user directs the system to perform various available user actions. Throughout the specification and claims, user actions used to control the system may be referred to as commands, instructions, directions, input, gestures, or actions. These actions may be performed by pressing buttons, turning knobs, moving sliders, touching the touch-sensitive screen of the device, double tapping, dragging, pinching, sliding or any other gestures commonly used to interact with a touch screen-device. One or ordinary skill in the art would recognize that any user action may be used to interact with the computer, sun visor device, or automotive visualization system.

Figure 2A:
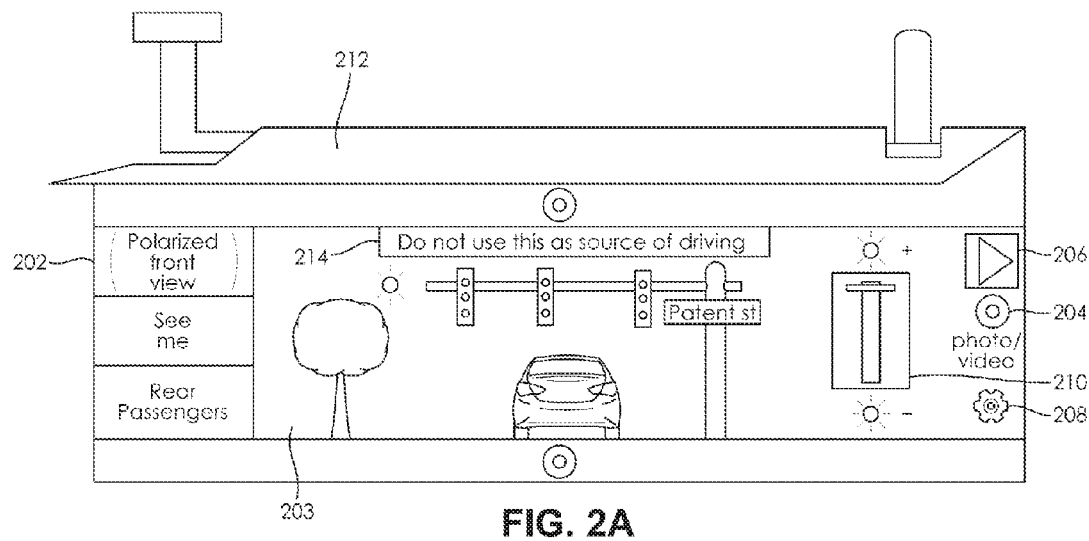
FIG. 2A is a diagram which illustrates the view displayed when the 'Polarized front view' camera is selected on the sun visor's LCD touch screen. In addition, it also illustrates some of the common functions/features of the sun visor's touch screen display. For example: ability to take and upload photos/videos of any camera views using 'Take Photo/Video' button, ability to review photos/videos of any camera views using 'Review Photos/Videos' button, ability to access general settings using 'Settings' button, ability to reduce bright light on screen using 'Brightness adjuster', ability to close the sun visor using a sun visor's cover, etc.
Figure 5:
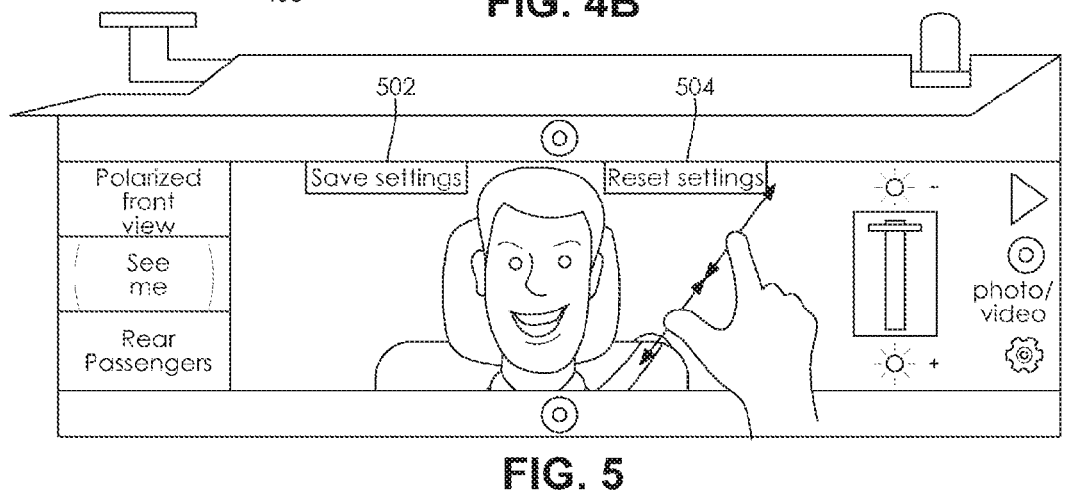
FIG. 5 is a diagram which illustrates the zoom software module. As shown, the software module would allow the user to slide two fingers across the LCD touch screen to zoom in or out of a portion of the currently displayed camera view/image. It also illustrates that if a user touches the sun visor's touch screen display while a camera view is displaying on the screen, then the following two options 'Save settings', 'Reset settings' would automatically appear at the top of the screen for approximately 10 seconds and then those options would disappear after those 10 seconds until the user taps/touches the screen again. (Exception: If there were multiple rear passenger cameras displaying on the sun visor's touch screen for the 'Rear passengers' view, then the 'Save settings' and 'Reset settings' options would be disabled on that screen.) 'Save settings' option would allow the user to save any settings for an individual camera view and those settings would be automatically applied in future whenever the user opens that camera view again. Example of settings that would be saved: brightness, zoom in, zoom out, camera angle for top, left, bottom, right, etc. 'Reset settings' option would allow the user to reset any settings previously stored for an individual camera view back to their original settings. Example of settings that would be reset: brightness, zoom in, zoom out, camera angle for top, left, bottom, right, etc.
Figure 7A:
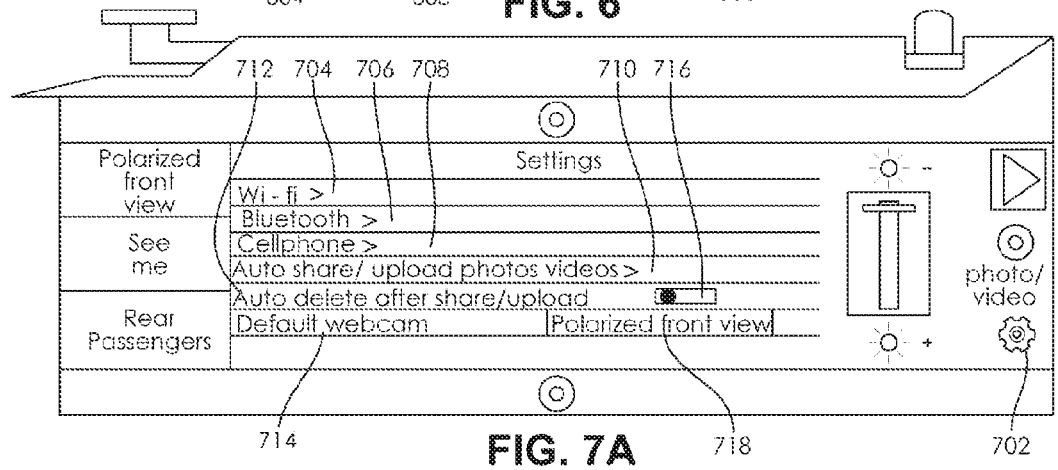
FIG. 7A illustrates an exemplary 'Settings' screen on the sun visor's multi-functional touch screen device. This screen would allow the users to either setup or enable/disable features like Wi-Fi, Bluetooth or Cellular. Also, there would be additional options like 'Auto share/upload photos videos', 'Auto delete after share/upload', 'Default webcam/camera', etc.
Figure 7B:
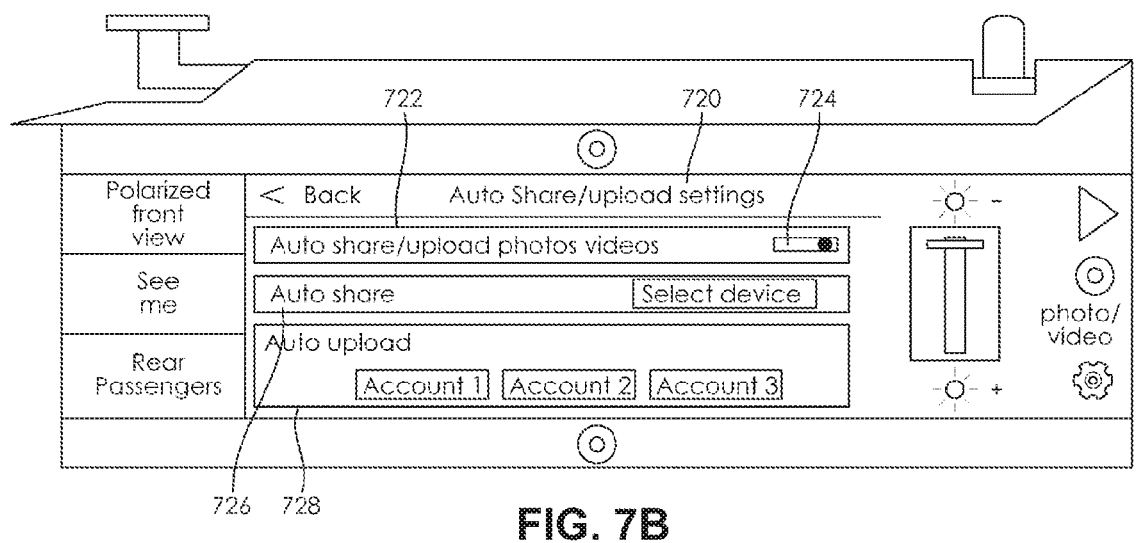
FIG. 7B illustrates an exemplary 'Auto share/upload settings' screen, which is sub-part of the 'Settings' screen on the sun visor's multi-functional touch screen device. This screen would allow the users to either setup 'Auto share' or 'Auto upload' options for photos/videos on the device.
Figure 9:
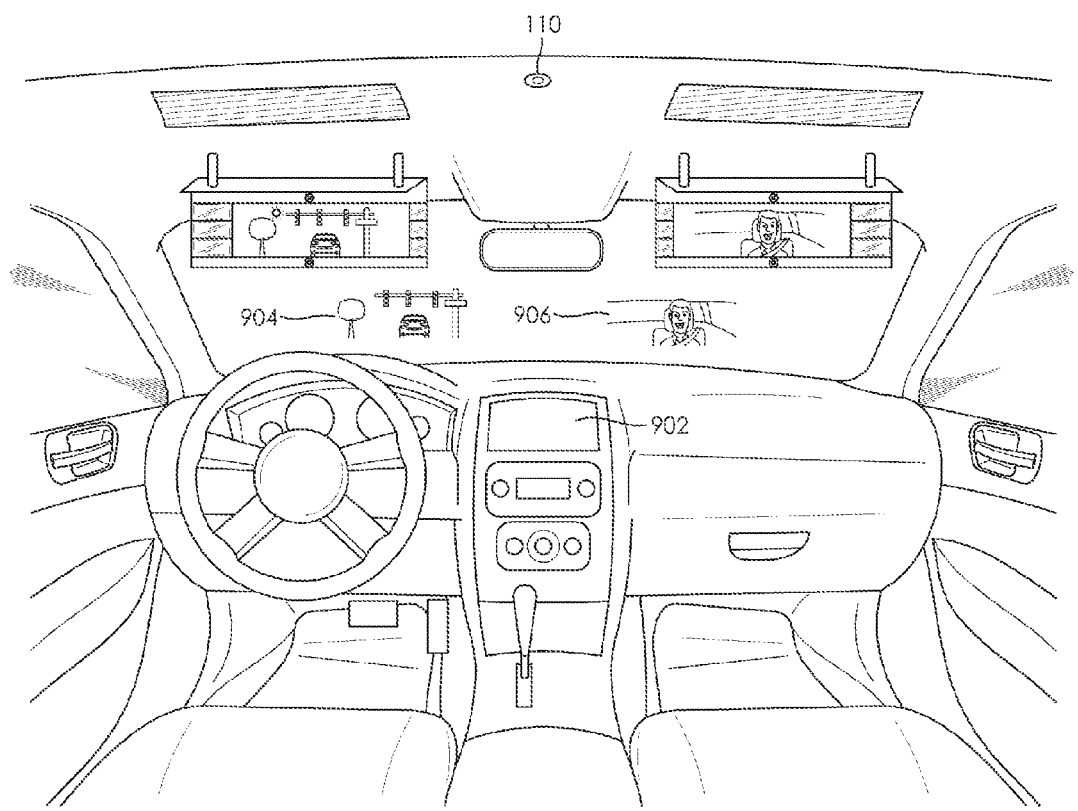
FIG. 9 is a diagram which illustrates the operation of the system in connection to a Head-up Display system installed within the vehicle.

The tablet like LCD touch screen devices 102 and 104 each consist of an LCD touch screen, several built-in cameras, interface to external cameras and a computer communicated to the LCD touch screen. The computer includes software modules stored in a memory therein allowing a user to manipulate controls displayed on the LCD touch screen to direct the operation of the system. As shown in FIG. 1 and FIG. 2A, included in these software modules are programs allowing the user to select which of the camera views to display at any given time, direct a selected camera to capture still images or videos by selecting the "Take Photos/Videos" control 204 displayed on the LCD touch screen, display captured still images or videos by selecting the "Review Photos/Videos" control 206 displayed on the LCD touch screen, adjust settings for each of the cameras by selecting the "Settings" control 208 displayed on the LCD touch screen. In addition, as shown in FIG. 5, included in the software modules are programs allowing the user to save settings for each of the cameras by selecting the "Save Settings" control 502 displayed on the LCD touch screen, reset settings for each of the cameras by selecting the "Reset Settings" control 504 displayed on the LCD touch screen, zoom in or out of a portion of the currently displayed camera view by sliding two fingers away from each other (to zoom-in) or toward each other (to zoom-out) on the desired portion of the view displayed on the LCD touch screen as shown in FIG. 5. In addition, as shown in FIG. 7A and FIG. 7B, software modules also include programs that allow the user to automatically upload or share still images and/or video captured by each camera to an online account or a Bluetooth enabled device by activating the "auto upload/share" function. In addition, as shown in FIG. 9, for vehicles equipped with heads-up display systems 904, 906, the computer would include software modules enabling the computer to display the selected camera view on the head-up display (HUD) system 904, 906, thereby minimizing distractions for the driver. In such a vehicle, the computer includes software modules that direct the sun visor's LCD screen to shut down after a specified number of seconds while the HUD system 902 is activated, enable the user to direct the computer to turn the LCD screen back on after it is shut down due to activation of the HUD system 902 by tapping the sun visor's LCD screen, and allow simultaneous operation of the sun visor's LCD screen and the HUD system by pressing continuously on the sun visor's LCD screen for a specific number of seconds.

According to an embodiment of the present invention, the system provides a graphical user interface (GUI) which allows the user to interact with and control the system through a touch screen interface. The GUI includes a selection region on the left side of the display with three software buttons for switching between the different views, including a front view, a rear passenger view, and a "see me" view, which uses the "see me" camera to simulate a mirror. If more cameras are included or interfaced with the sun visor system, a button will be present in the GUI for switching the view corresponding to that camera. One or ordinary skill in the art would recognize that any number of buttons could be used without departing from the spirit and scope of the present invention. On the right side is a user action region containing action areas for capturing images and videos, viewing captured images and videos, accessing system settings, and adjusting brightness. In the center of the display area of the display apparatus, between the view selection region and the user action region, is the image viewing area. The image viewing area displays the camera feed from any one or more of the available cameras, captured images, or other user control and settings interfaces. Throughout this specification the term image or images may refer to still images, video images, recorded images, or live images.

According to an embodiment of the present invention, the system automatically transfers captured images and/or videos to another location over a wireless connection. The other location may be a central server providing a data storage or transmission service, a cellphone, tablet, another automotive visualization system in a nearby vehicle, or any other wireless device within communication range of the system. The wireless connection may be Bluetooth, 802.11 Wi-Fi, cellular, LTE, or other wireless communication technologies. One or ordinary skill in the art would recognize that any wireless communication technology may be used to transfer captured images and/or videos without departing from the spirit and scope of the present invention.

As shown in FIG. 1, the preferred embodiment of the invention would include multiple set of cameras each displaying a specific camera view. By selecting the corresponding control displayed on the LCD touch screen on the tablet like device, the user directs the computer to display still images and/or video images from the selected camera onto the sun visor's LCD touch screen. FIG. 2A depicts the view 203 displayed when the "polarized front view" control 202 is selected by the user, and in FIG. 2B, the polarized front view camera 216 is shown how it's visible from the front of the vehicle. For this application, "polarized front view" refers to a view of the vehicle environment located in front of the vehicle and including traffic lights, street signs, and traffic ahead of the vehicle, which would typically be blocked when a conventional sun visor is in use. This camera has a lens that is both auto polarized and auto photochromic, and there would also be software modules on computer that can apply polarization and photochromic effects on the camera view. In the preferred embodiment, the "polarized front view camera" 108 is placed near the bottom-center of the sun visor's tablet like device as shown in FIG. 1.

According to an embodiment of the present invention, polarization and/or photochromic effects may be used to remove glare from the image captured by the camera. Software may be used to apply polarization or photochromic effects to remove glare produced by bright light sources in view of the camera. Other software methods, such as local dimming, or software-implemented photographic filters may be used to reduce glare. One or ordinary skill in the art would recognize that any software method that reduces glare may be used to reduce glare without departing from the spirit and scope of the present invention. One of ordinary skill in the art would recognize that the camera features of polarization and photochromic effects could be applied to any camera described herein without departing from the spirit and scope of the present invention.

According to an embodiment of the present invention, a camera is installed in the back face of the sun visor which points toward the outside of the vehicle when the sun visor is deployed. Deploying the sun visor consists of moving the sun visor from an inactive position to an active position, or a stowed position to an un-stowed position, or a folded position to an unfolded position. Although this position might not face the front of the vehicle when the sun visor is not in use, the camera placed in the back of the sun visor would move into a position that faces the front of the vehicle whenever the sun visor is deployed. Alternatively the camera may be installed behind the rear view mirror, at the top of the windshield, outside the vehicle, or in the back side of the device's display, pointing through the sun visor toward the front of the vehicle. One or ordinary skill in the art would recognize that a camera could be installed in any position that faces the front of the vehicle, even if it only faces the front of the vehicle at certain times.

According to an embodiment of the present invention, when the camera is installed in the back face of the sun visor such that it moves into a position that faces the toward front of the vehicle when the sun visor is deployed, a switching mechanism may be used to switch on the camera and/or the display when the sun visor is deployed. The switching mechanism, may be a mechanical button, a software button, an optical sensor, a magnetic switch, a capacitive sensor or any kind of sensor or switch capable of sending a signal or opening or closing a circuit when the sun visor is deployed. One or ordinary skill in the art would recognize that any kind of switching mechanism could be used without departing from the spirit and scope of the present invention. The switching mechanism may be positioned on the dashboard, on the steering wheel, incorporated into the vehicle's computer user interface, placed in the ceiling, or built into the sun visor hinge. One or ordinary skill in the art would recognize that the switching mechanism could be placed anywhere without departing from the spirit and scope of the present invention.

According to an embodiment of the present invention, the switching mechanism may also be used to activate the rear camera view or see-me camera view. For the see-me camera in particular, the switching mechanism may be incorporated into a cover or flap that covers the display, such as the cover or flap that covers the mirror on a traditional sun visor. One of ordinary skill in the art would recognize that the switching mechanism, wherever it is placed, may be used to activate any of the camera views available in the sun visor system without departing from the spirit and scope of the present invention.

According to an embodiment of the present invention, the LCD touch screen may be substituted with any kind of display apparatus. This may be an OLED screen, a plasma screen, an E-ink display, a Head Up Display, or any other kind of display. One or ordinary skill in the art would recognize that any display apparatus may be used without departing from the spirit and scope of the present invention.

Figure 3:
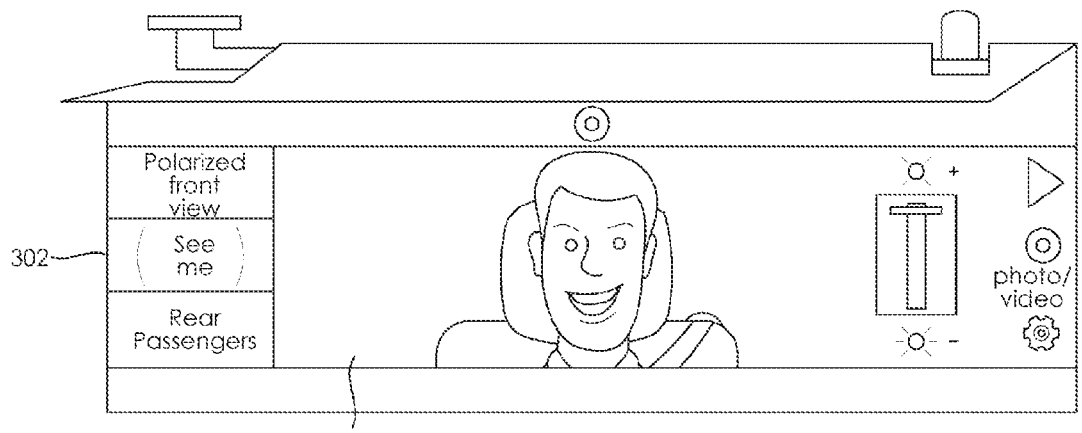
FIG. 3 is a diagram which illustrates the view captured when the 'See me view' camera is selected on the sun visor's LCD touch screen. This 'See me' camera would be displayed on the screen when a user taps on the 'See me' button that's available on the left side of the sun visor's touch screen display.

FIG. 3 depicts the view 304 displayed when the "see me view" control 302 is selected. For this application, "see me view" refers to a view of the front-seated driver or the passenger, who is directly sitting in front of that camera. In the preferred embodiment, this "see me camera" 106 is placed near the top-center of the sun visor's tablet like device as depicted in FIG. 1.

Figure 4A:
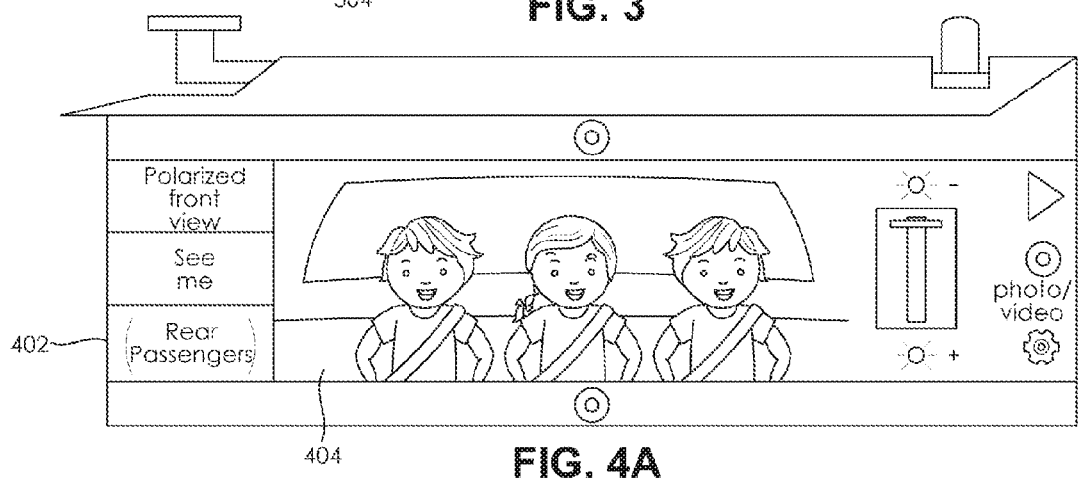
FIG. 4A is a diagram which illustrates the view captured by a single 'Rear passengers' camera when the "rear passenger view" camera is selected on the sun visor's LCD touch screen.
Figure 4B:
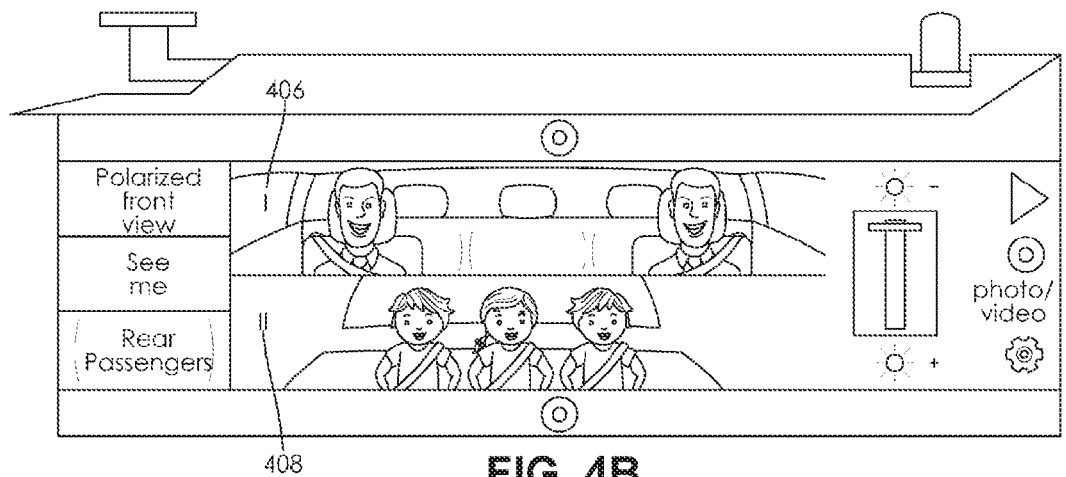
FIG. 4B is a diagram which illustrates the view captured when 'Rear passengers' camera is selected on the sun visor's LCD touch screen where there are multiple 'rear passenger view' cameras installed in the vehicle. This figure shows that since there are multiple rear passenger cameras installed in the vehicle for displaying either single rear passenger row or multiple rear passenger rows, therefore, the main screen would be automatically split (either vertically and/or horizontally) on the 'Rear Passengers' camera view and would display all the 'Rear passengers' cameras. (Note: If the user wants to enlarge one of the rear passenger cameras, then they would be able to double tap on that camera view on the touch screen display to enlarge it. However, if the user wants to restore an already enlarged rear passenger camera, then they would be able to double tap on that camera view on the touch screen display to restore it again i.e. all rear passenger cameras would be visible again on the screen.)

FIGS. 4A and 4B depict the view 404 displayed when the "rear passenger view" control 402 is selected. For this application, "rear passenger view" refers to a view of any of the rear-seated passengers. In the preferred embodiment, this "rear passengers" camera is placed on the ceiling/roof of the vehicle. As shown in FIG. 4B, the preferred embodiment includes multiple "rear passenger views" 406, 408, displaying that the system is capable of showing an additional row of rear seated passengers where the vehicle has more than one row of rear seated passengers.

FIG. 5 shows a user operating the zoom function. The software module would allow a user to use two fingers to zoom in or out on a portion of the sun visor's LCD screen.

Figure 6:
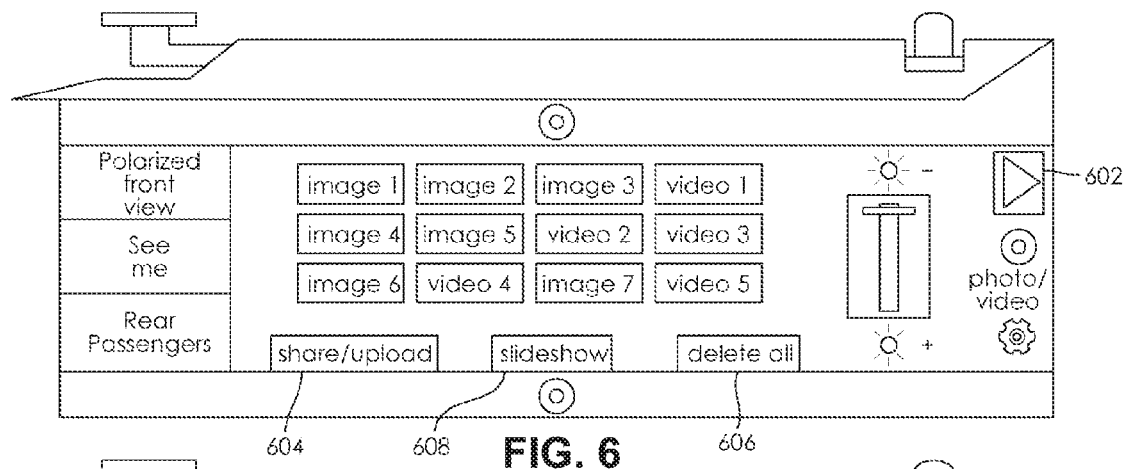
FIG. 6 is a diagram which illustrates the display presented on the LCD screen when the 'Review Photos/Videos' control is selected on the sun visor's LCD touch screen. This screen would allow the users to view any photos or videos that were previously taken by that device. Also, there would be options available on this screen to either view photos/videos in a slideshow, ability to delete all photos/videos or manually share/upload individual photos/videos.

FIG. 6 illustrates the preferred embodiment of the "Review Photos/Videos" module 602. A user would be able to view stored images in a slide show by selecting the slideshow control 608, share/upload content using the "share/upload control 604, and delete all stored content using the delete all control 606.

Here are the common features that would be available on the sun visor's touch LCD screen device regardless of which camera view is displayed on the screen—

As shown in FIG. 2A, FIG. 3, and FIG. 4A, there would be buttons available on the left side of the touch screen display ('Polarized Front View' 202, 'See me' 302, 'Rear passengers' 402) to go to any of the camera views. (Note: There can also be additional camera views that can be integrated or interfaced with the sun visor's LCD touch screen device and displayed on it. For example: 'Rear polarized view' camera can also be displayed on the sun visor's LCD touch screen, so when the vehicle is being reversed, it would display the rear view of the vehicle on the sun visor's LCD touch screen, and that view would also be auto polarized and auto photochromic.)

As shown in FIG. 5, on the sun visor's touch screen display, a user would be allowed to touch and move the camera view up, down, right, left, or even zoom in or zoom out based on their needs. (Exception: If the same rear passenger camera is connected to all the sun visors, then when both the driver and the front passenger have 'Rear passenger' camera up on their touch screen display, then only the first person that opened the 'Rear passenger' camera would be allowed to move the camera view up, down, right, left, or even zoom in or zoom out on their sun visor's touch screen display. In this case, a note would be displayed to the second person that they don't have permission to move the 'Rear passenger' camera because it's already open on the other sun visor's touch screen display, but they would at least be able to see the camera view that the first person was already watching. For example: If the driver had already opened one of the rear passenger cameras on their sun visor's touch screen display, and thereafter, the front passenger also tries to bring up that same rear passenger camera on their sun visor's touch screen display, then the latter would still be able to view the camera, however, all the options to move, zoom, etc. would be disabled for the latter until the person that opened the rear passenger camera first closes it on their display). Note: To begin with, if there were separate rear passenger cameras attached to each sun visor, then the rear passenger view functionality can also be independent on each sun visor like the other camera views. In fact, the same concept would apply to any cameras that are connected to the sun visor's LCD touch screen.

As shown in FIG. 2A, on the sun visor's touch screen display, a user would have the ability to adjust the brightness of the screen using a brightness adjuster 210, so they can avoid being distracted with bright light while driving. Note: The brightness adjuster would have a transparent background on the sun visor's touch screen display for any of the camera views.

As shown in FIG. 5, if a user touches the sun visor's touch screen display while a camera view is displaying on screen, then the following two options 'Save settings' 502, 'Reset settings' 504 would automatically appear at the top of the screen for a set amount of time, for example 10 seconds, and then those options would disappear after that time until the user taps/touches the screen again. (Exception: If there are multiple rear passenger cameras displaying on the sun visor's touch screen for the 'Rear passengers' view, then the 'Save settings' and 'Reset settings' options would be disabled on that screen. Note: only when a user enlarges one of the rear passenger cameras by double tapping on it, then the 'Save settings' and 'Reset settings' options would be re-enabled on the screen.) 'Save settings' option would allow the user to save any settings for an individual camera view and those settings would be automatically applied in future whenever the user opens that camera view again. Some example of settings that would be saved include: brightness, zoom in, zoom out, camera angle for top, left, bottom, right, etc. 'Reset settings' option would allow the user to reset any settings previously stored for an individual camera view back to their original settings. Some example of settings that would be reset include: brightness, zoom in, zoom out, camera angle for top, left, bottom, right, etc. Note: This functionality to save or reset the camera view settings can also be easily extended to multiple users if more than one person were planning to use the vehicle.

As shown in FIG. 2A, 'Take Photo/Video' option 204 would be available on the sun visor's touch screen display, which would allow the users to take photos or videos of either of the camera views displayed on the sun visor's LCD touch screen.

User would be allowed to select if they wish to take a photo or a video for the displayed camera view. When 'Photo' option is selected that's next to 'Take Photo/Video' control, it would allow the user to take photo of the camera view that's visible on the touch screen display by simply tapping once on the round circle above the 'Photo' button. When 'Video' option is selected that's next to 'Take Photo/Video' control, it would allow the user to take video of the camera view that's visible on the touch screen display by simply tapping once on the round circle above 'Video' button, which would start recording, and then another tap on the round circle above 'Video' button would stop recording.

There would be built-in memory on the sun visor's touch screen device (For example: 64 GB), which would allow to locally store photos and videos taken by that device.

As shown in FIG. 2A and FIG. 6, 'Review Photos/Videos' option 206, 602 would be available on the sun visor's touch screen display, which would allow the users to view any photos or videos that were previously taken by that device. Note: some examples of the options available on the 'Review Photos/Videos' screen would include an option to view photos/videos in a slideshow 608, ability to delete all photos/videos 606, manually share/upload individual photos/videos 604, etc. While reviewing the individual photos/videos on the 'Review Photos/Videos' screen, a user would be able to use Bluetooth, cellular or Wi-Fi features to either manually share the photos/videos to another device or upload them to central online location. Note: using the Bluetooth feature, a user would also have the ability to manually share photos/videos from one sun visor's touch screen device to another sun visor's touch screen device. In fact, even vehicles standing/driving close to each other would be able to connect with each other using Bluetooth, etc. and share photos/videos and display those on their sun visor's LCD touch screen.

As shown in FIG. 2A, a sun visor's touch screen display would automatically turn on when the sun visor cover 212 is pulled up/opened, and on the other hand, the sun visor's touch screen display would automatically turn off when the sun visor cover 212 is pulled down/closed.

Figure 8:
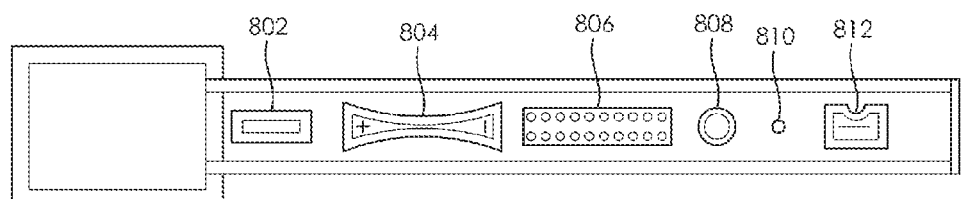
FIG. 8 illustrates an exemplary side view of the sun visor's multi-functional touch screen device. The following options would be available on the side view—an on/off switch to either turn on or turn off the touch screen display, a speaker for playback of stored videos, a volume control to increase or decrease the volume for playback of any stored videos, a headphone jack for individual listening to audio of any stored videos, a microphone for recording of audio while taking videos, and an Audio/video out/Digital terminal that would allow the user to connect to a computer using a USB data cable and transfer photos/videos stored on the sun visor's LCD touch screen device. Note: The above mentioned features on the side of the sun visor's LCD touch screen device are just for exemplary purposes, however, as technology advances in future, additional ports and/or options can be added to this LCD touch screen device to enhance the use of these devices.

As shown in FIG. 8, there would be an on/off switch 802 to either turn on or turn off the sun visor's LCD touch screen display.

As shown in FIG. 8, there would be a volume control 804 to increase or decrease the volume for any videos playing on the sun visor's LCD touch screen display.

As shown in FIG. 8, there would be a speaker 806 to listen to the audio of any videos on the sun visor's LCD touch screen display.

As shown in FIG. 8, there would be a headphone jack 808 for individual listening to audio of any videos on the sun visor's LCD touch screen display.

As shown in FIG. 8, there would be a microphone 810 to record the audio along with the videos on the sun visor's LCD touch screen display.

As shown in FIG. 8, there would be Audio/video out/Digital terminal 812 that would allow the user to connect to another computer device using a USB data cable or other transfer means. Once the sun visor's touch screen device and the other computer are connected, a user would be able to transfer any photos/videos from sun visor's touch screen device to that computer. (Note: It would be possible for a user to detach the entire sun visor or the sun visor's touch screen device from the vehicle and transfer any photos/videos from that sun visor's touch screen device to another computer using a USB connection or other available transfer means.)

Figure 10:
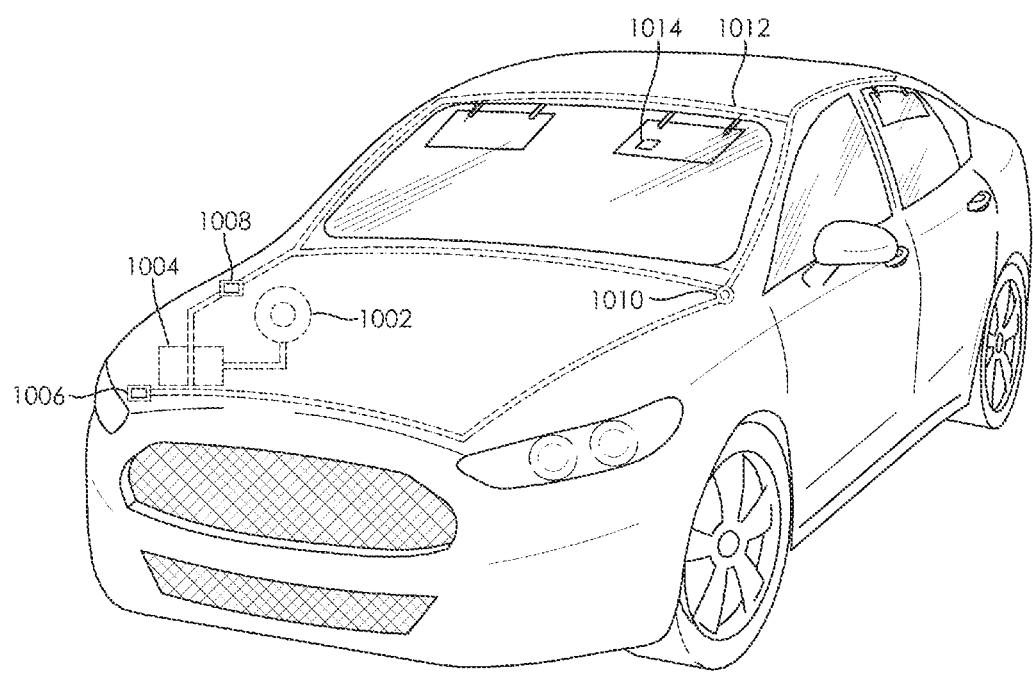
FIG. 10 is a diagram of the power connection from the sun visor device into the vehicle's power system.

As shown in FIG. 10, the charging system for the sun visor device would mainly include the vehicle's alternator 1002, voltage regulator 1006, the vehicle battery 1004, a battery fuse 1008, a built-in rechargeable battery 1014 on the sun visor device itself, and the associated wiring and its harness 1010.

While the vehicle's engine is running and the sun visor device is connected to the sun visor hinge system 1012, the vehicle's alternator 1002 would supply the necessary power to the sun visor device. However, if the capacity of the alternator 1002 is exceeded, then the vehicle's battery 1004 would supply the necessary power to the sun visor device, even though the vehicle's engine might be running. In this case, it would be indicated to the user that the vehicle's battery 1004 is being utilized to supply the power to the sun visor device.

If the vehicle's engine isn't running, however, the sun visor device is connected to the sun visor hinge system 1012, then the vehicle's battery 1004 would supply the necessary power to the sun visor device. Note: it would also be indicated to the user that the vehicle's battery 1004 is being utilized to supply the power to the sun visor device. However, if the vehicle's battery 1004 is about to fully drain out i.e. no more capacity, then rather than using the vehicle's battery 1004, the sun visor device would use its built-in rechargeable battery 1014 even though the sun visor device is connected to the sun visor hinge system. In this case, it would be indicated to the user that the rechargeable battery 1014 on the sun visor device itself is being utilized to supply the power to the sun visor device.

If the sun visor device is no longer connected to the sun visor hinge system 1012, then regardless if the vehicle's engine is running or not, the rechargeable batteries 1014 within the sun visor device would supply the necessary power to the sun visor device. In addition, it would be indicated to the user that the rechargeable battery 1014 on the sun visor device itself is being utilized to supply the power to the sun visor device.

According to an embodiment of the present invention, any power that's supplied to the sun visor device system would pass through the voltage regular 1006 to control the amount of voltage passed through. Similarly, there would also be a battery fuse 1008 to protect over current being passed through. Note: It is to be clearly understood that any other mechanisms to control the amount of voltage or current that's passed through to the sun visor device system would be within the scope and spirit of the invention. According to an embodiment of the present invention, the wiring 1010 from the alternator and the battery would run parallel through the sides of the engine, and then from the space available between the vehicle's side mirror and the front windshield over to the dashboard of the vehicle, which would be further extended to supply the power to the sun visor hinge system 1012 on the ceiling of the vehicle. Similarly, the associated wiring can also be extended to the rear seat sun visors, if present. Note: It is to be clearly understood that there are many different ways to run the wiring from the alternator and the battery to the sun visor device in a vehicle, and that's within the scope and spirit of the invention.

According to an embodiment of the present invention, wiring 1010 from the vehicle's alternator 1002 or the battery 1004 can also be extended to the sun visor device's switching on/off mechanism or the HUD system that's interfaced with the sun visor device system.

According to an embodiment of the present invention, the power from the vehicle's alternator 1002 or the battery 1004 would be sent to one side of the sun visor hinge system 1012 to charge the sun visor device when connected i.e. both sides/hooks of the sun visor hinge system would not need to be have the power coming in and this would allow the user to snap out the sun visor from one side of the sun visor hinge system and turn the sun visor towards the side window and still continue to get the sun visor device to keep charging. Note: It is to be clearly understood that there are many different ways to charge the sun visor device i.e. using both sun visor hinges, using one sun visor hinge, or wireless charging, etc., and that's all within the scope and spirit of the invention.

According to an embodiment of the present invention, the sun visor device receives power from the electrical system of the vehicle. This power may be passed from the vehicle to the sun visor device in a variety of ways. In one embodiment, a primary inductive charging coil is embedded in the ceiling of the vehicle and a secondary inductive charging coil is embedded in either the sun visor or the housing of the sun visor device itself. When the sun visor is stowed, the secondary charging coil comes into proximity with the magnetic field generated by the primary charging coil and produces an electric current that is used to charge the sun visor device. In this particular embodiment, deploying the sun visor disconnects the sun visor device from the inductive power source and it runs on the internal rechargeable battery.

According to another embodiment of the present invention, a flexible ribbon cable passes from the vehicle interior through the housing of the sun visor hinge to provide power and data connection to the sun visor device. In yet another embodiment, electrical leads are built into the hinge system with rotatable contacts on the vehicle interior end of the hinge and the sun visor end of the hinge. These contacts allow the hinge to be repositioned in the stowed or deployed position while still providing power through the hinge to the sun visor device. One or ordinary skill in the art would recognize that power may be provided to the sun visor device through any means without departing from the spirit and scope of the present invention.

Here are some additional details about the 'Polarized front view' camera, which can be activated though the sun visor's touch screen display—

Figure 2B:
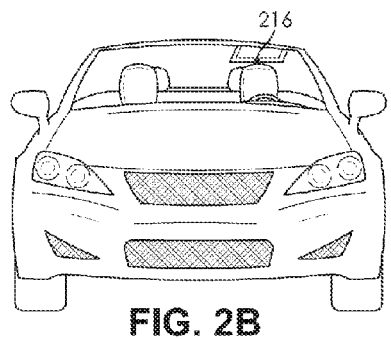
FIG. 2B is a diagram which shows the 'polarized front view' camera on the sun visor's touch screen display from outside the vehicle. As shown, this camera would be externally facing and therefore visible from in front of the vehicle.

As shown in FIG. 1, FIG. 2A and FIG. 2B, for exemplary purposes, 'Polarized front view' camera 108 is located near the bottom-center of the sun visor's touch screen device. Note: this 'Polarized front view' camera would actually be facing towards the front of the vehicle i.e. external view. Therefore, if the sun visor was pulled down and a user went outside the vehicle and looked, then they would still be able to see 'Polarized front view' camera 216 near the bottom-center on the back side of the sun visor's touch screen device.

As shown in FIG. 2A, by default the intent of this camera would be to display on the main screen 203 the traffic lights, information boards, street names, etc., which are usually higher up on the road and aren't usually visible when a traditional sun visor is pulled down. Note: By being able to view the above mentioned information on the sun visor's touch screen display, a user wouldn't have to look from the sides of their sun visor to get that information.

This 'Polarized front view' camera would have lens that has both auto polarization and auto photochromic effect and also there would be software modules, which would help to automatically reduce glare and also darken/lighten the view depending upon the outside light. For example: Even if the sun was right in front of the vehicle, then also a user would still be able to look at the external things like traffic light, street names, etc. using the 'Polarized front view' camera. In addition, even during night time, a user would still be able to get external information using the 'Polarized front view' camera. Note: Since most of the windshields have ultraviolet protection built in them, the photochromic effect mentioned above would even take place in the visible light that's without the ultraviolet rays.

As shown in FIG. 2A, this 'Polarized front view' would be the default camera view when the sun visor's touch screen display is turned on. In addition, the 'Polarized front view' button 202 on the left side of the touch screen display would be highlighted on the screen. (Note: As shown in FIG. 7A, a user would have the ability to change the screen's default camera 714, 718 by going to the 'Settings' screen available on the sun visor's touch screen display.)

Note: As shown in FIG. 2A, for safety purposes, sun visor that's in front of the driver of the vehicle would display the following disclaimer whenever the 'Polarized front view' camera is activated on the sun visor's LCD touch screen— "Do not use this view as your source of driving" 214 (Note: Any other multi-functional sun visors present in the vehicle, except the driver's sun visor, wouldn't display the above mentioned disclaimer message since those users aren't driving.)

Here are some additional details about the 'See me' camera view, which can be activated though the sun visor's touch screen display—

As shown in FIG. 1 and FIG. 3, for exemplary purposes, 'See me' camera 106 is located near the top-center of the sun visor's touch screen device.

Note: This 'See me' camera can be placed at an angle, so by default its intent would be to display maximum view/body of the person, who's sitting inside the vehicle in the front of that camera, on the main screen 304 of the sun visor's touch screen display.

As shown in FIG. 3, 'See me' button 302 on the left side of the touch screen display would be highlighted when this 'See me' camera view is displayed on the screen.

Here are some additional details about the 'Rear passengers' camera views, which can also be activated though the sun visor's touch screen display—

As shown in FIG. 1 and FIG. 4A, for exemplary purposes, 'Rear passengers' camera/s 110 would be located near the ceiling/roof of the vehicle. Depending upon the size of the vehicle, either one or two cameras would be installed for each rear passenger row, and if the vehicle has more than two rows of seating, then additional cameras would also be added for each additional row of rear passengers. These one or multiple rear passenger cameras would together create the view for the 'Rear passengers' camera screen 404 on the sun visor's touch screen display.

a. For example: As shown in FIG. 4A, if only one camera is present for displaying the rear passenger row in the vehicle, then only that camera would be displayed when 'Rear Passengers' view is opened. However, as shown in FIG. 4B, if there were multiple cameras present for displaying either single rear passenger row or multiple rear passenger rows, then the screen would be split (either vertically and/or horizontally) on the 'Rear Passenger's camera view and would display all the rear passenger cameras 406, 408.

If the user wants to enlarge one of the rear passenger cameras, then they would be able to double tap on that camera view on the touch screen display to enlarge it. However, if the user wants to restore an already enlarged rear passenger camera, then they would be able to double tap on that camera view on the touch screen display to restore it again i.e. all rear passenger cameras would be visible again on the screen.

Note: These rear passenger cameras 110 can be placed at an angle, so by default their intent would be to display the maximum view of the people sitting inside the vehicle on rear passenger seats.

As shown in FIG. 4A, 'Rear passengers' button 402 on the left side of the touch screen display would be highlighted when any of the rear passengers camera view is displayed on the sun visor's LCD touch screen.

This solution would also include a 'Settings' screen that can be accessed through the multi-functional LED touch screen display—

As illustrated in FIG. 7A, for exemplary purposes, on the touch screen display of a sun visor, there would be a 'Settings' option 702, which when clicked would open the 'Settings' screen.

As illustrated in FIG. 7A, on the 'Settings' screen, users would have an option to either setup or enable/disable features like Wi-Fi 704, Bluetooth 706 and Cellular 708.

As illustrated in FIG. 7A and FIG. 7B, there would be an 'Auto share/upload photos videos' option 710 available on the 'Settings' screen. When a user clicks on the 'Auto share/upload photos videos' option, they would be taken to a new screen named 'Auto share/upload settings' 720. On the 'Auto share/upload settings' screen, if the user enables 724 the 'Auto share/upload photos videos' field 722, then the following two options would become visible—one for auto share settings 726 for sharing photos/videos with another Bluetooth device and second for auto upload settings 728 for uploading photos/videos to a central online location using Wi-Fi or cellular. For the former, a user would be able to select an already connected Bluetooth enabled device for the auto share to take place, and for the latter, a user would be able to select and set up the online accounts/services that allow to store photos/videos at a central online location. Note: It's up to the user if they want to set up both auto share and auto upload, or just one of them, or none. Note: Since both the sun visors' touch screen devices have Bluetooth functionality, therefore, any of the photos/videos taken using one of the sun visor's touch screen device can also be shared with another sun visor's touch screen device itself either automatically or manually as long as the Bluetooth devices are connected to each other. In short, sharing photos/videos from a sun visor's touch screen device to any Bluetooth enabled devices i.e. smartphones, tablets, smartwatches, etc. would be possible.

As illustrated in FIG. 7A, there would be an 'Auto delete after share/upload' option 712, which would be initially grayed out by default. However, when the user enables the 'Auto share/upload photos videos' field 722 on the 'Auto share/upload settings' screen 720, then this 'Auto delete after share/upload' option 712 would be visible i.e. would be no longer grayed out. If the user enables (turns on) 716 this 'Auto delete after share' option 712, then the system would automatically delete any photos/videos present on sun visors' touch screen device after they have been successfully shared and/or uploaded depending upon the user's selection. Note: If both auto share and auto upload are set up, then the system would complete both of those tasks successfully before deleting any photos/videos from the sun visor's touch screen device.

As illustrated in FIG. 7A, there would be a 'Default camera' field 714 available on the 'Settings' screen with 'Polarized front view' camera 718 set as the default camera. A user would be allowed to change this 'Default camera' field 714 to either 'See me' camera, or the 'Rear passengers' camera, or another camera that's connected to the sun visor's touch screen device. Note: Once the 'Default camera' field has been changed on this Settings screen, the newly selected camera view would remain as the default view for any future use until the user updates it again.

Here are some additional notes regarding this invention—

When a sun visor remains plugged to the sun visor slot of the vehicle, it would receive the electrical connection from the vehicle for its touch screen device to function as well as to recharge its built-in battery. However, when a sun visor isn't plugged to the sun visor slot of the vehicle, the sun visor's touch screen device would run on its built-in rechargeable battery until the battery runs out.

A user would be able to access/operate the sun visor's multi-functional touch screen display even when the vehicle isn't turned on i.e. the sun visor's touch screen device would run using its built-in rechargeable battery in this case, and battery symbol would be displayed on its screen to indicate the amount of remaining battery.

A user would be able to pull out/detach the entire sun visor or the sun visor's LCD touch screen device from the vehicle and would be able to take photos/videos using its built-in cameras or transfer any photos/videos from that sun visor's touch screen device to another computer using a USB connection 812 or other similar transfer means. (Note: The sun visor's touch screen device would run on its built-in rechargeable battery while out of the sun visor slot of the vehicle.)

An alternate is that rather than displaying any of the camera views i.e. 'Polarized front view', 'See me', 'Rear passengers', or any other camera views on the sun visor's LCD touch screen itself, they can also be displayed on any other LCD screens available in any other part of the vehicle.

According to an embodiment of the present invention, a camera, display apparatus, computer processor, rechargeable battery, and non-volatile computer memory are incorporated into a housing to create a sun visor video device resembling a tablet PC. This sun visor device fits into a molded form within the sun visor and a cutaway for the camera opens toward the front of the vehicle. This sun visor video device can be removed or detached from the sun visor body and used to capture images, view images, share images, etc. independently of the sun visor. Alternatively the sun visor device may attach to whatever sun visor hinge system is used in the vehicle, taking the place of the sun visor itself. The sun visor hinge system and the sun visor device may be configured to allow the sun visor device to be detached and reattached to the sun visor hinge system to allow the sun visor device to be used independently. Alternatively, the sun visor device of the present invention may have clips at the corners which allow the corners to wrap around, and clip onto, the edges or corners of the sun visor in a similar fashion to a cell phone case. The camera may be incorporated into one of the clips that wraps around the sun visor so that the camera can face the front of the vehicle when the sun visor is deployed. One or ordinary skill in the art would recognize that any method of removably attaching or mounting the sun visor device to the sun visor or sun visor hinge system may be used without departing from the spirit and scope of the present invention.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the embodiments.

I claim:

1. An automotive visualization system comprising:
a plurality of cameras;
a display apparatus comprising a display screen, wherein said display apparatus is mounted on or configured to be mounted on a vehicle sun visor such that when said sun visor is deployed, the display screen of said display apparatus faces toward a user of the sun visor;
a computer processor;
non-volatile computer memory storing computer instructions configured to:
receive an image from at least one of said plurality of cameras,
display said image on said display apparatus in real time,
display a graphical user interface (GUI) in a display screen of said display apparatus, said GUI comprising: touch screen controls providing an option to select a camera view for display on said display apparatus, said camera view comprising at least one of a front view of the area in front of the vehicle, a passenger view of passengers seated in the rear section of the vehicle, and a user reflective view showing a reflection of the user seated in the vehicle, wherein said camera view is defined by said image received from said at least one camera and said image comprises still image data or video image data which can be stored in said memory and transferred to another device; and
a switching mechanism configured to cause said display apparatus to turn on and/or off in response to said switching mechanism, wherein said display screen automatically turns on when a cover of said sun visor is opened, and the display screen automatically turns off when the cover is closed.

2. The automotive visualization system of claim 1 wherein a first of said plurality of cameras is positioned in the vehicle sun visor such that, when said sun visor is deployed, an aperture of the camera faces toward the front of said vehicle, so as to capture a view of the area in front of said vehicle.

3. The automotive visualization system of claim 1 further comprising:
a rechargeable battery; and
a housing configured to contain said rechargeable battery, at least one of said plurality of cameras, said display apparatus, said computer processor, and said non-volatile computer memory in the form factor of a tablet PC;
wherein said housing is configured to be detachable from said vehicle sun visor and said at least one camera, said display apparatus, said computer processor, and said non-volatile computer memory are powered by said rechargeable battery when said housing is detached from said vehicle sun visor.

4. The automotive visualization system of claim 1, wherein said processor and said memory are configured to interface with a Head Up Display, wherein said computer instructions are further configured to:
send said image to said Head Up Display for display,
turn off said display apparatus when said Head Up Display is in use, and
turn on said display apparatus in response to a user action in order to receive additional user inputs.

5. The automotive visualization system of claim 2, wherein said first camera produces a front image that is a polarized front image.

6. The automotive visualization system of claim 2 further comprising:
a second camera placed in a position in said vehicle that faces toward a user of a sun visor in said vehicle, and
wherein said display apparatus is configured to display a user image of said user, produced by said second camera, in response to a command entered by said user.

7. The automotive visualization system of claim 1 wherein said computer instructions are further configured to automatically transfer images and/or videos captured by said plurality of cameras to another location over a wireless connection.

8. The automotive visualization system of claim 1, wherein said plurality of cameras comprise:
one or more rear cameras placed in a position that faces a rear passenger seat of the vehicle, and
wherein said display apparatus is configured to display a rear view produced by said one or more rear cameras, in response to user input.

9. The automotive visualization system of claim 8, wherein said display apparatus is configured to:
display multiple rear views in a split view mode displaying each of said multiple rear views in a separate section of the display apparatus simultaneously, and
wherein said computer instructions are further configured to switch to an enlarged view of one of said multiple rear views in response to user input.

10. The automotive visualization system of claim 1, wherein said computer instructions are further configured to:
adjust focus and/or zoom of at least one of said plurality of cameras in response to user input.

11. The automotive visualization system of claim 10, wherein said computer instructions are further configured to:
save a focus and/or zoom level as a default camera setting, wherein a separate default camera setting is stored for each of said plurality of cameras, and
wherein said default camera setting is used when a camera view of at least one of said plurality of cameras is displayed.

12. The automotive visualization system of claim 1, wherein the display apparatus is configured to receive electrical power from an inductive charging coil embedded in the sun visor, wherein when the sun visor is stowed the inductive charging coil comes into proximity with a magnetic field generated by another charging coil embedded in the ceiling of said vehicle, and produces an electric current that is used to charge the display apparatus.

13. The automotive visualization system of claim 1, wherein said computer instructions are further configured to reduce glare affecting the image received from at least one of said plurality of cameras.

14. The automotive visualization system of claim 1, wherein said touch screen controls further comprise an auto share option for automatically uploading and sharing still or video images received from at least one of said plurality of cameras.

15. The automotive visualization system of claim 1, wherein said display apparatus is configured to operably couple to a hinge system of a vehicle sun visor, wherein said hinge system comprises electrical leads with rotatable contacts that are configured to provide electrical power to said display apparatus.

16. An automotive audio visual system comprising:
a housing;
a first camera positioned on a first side of said housing;
a display apparatus on a second side of said housing;
a computer processor;
non-volatile computer memory storing computer instructions configured to:
receive a first image from said first camera,
display said first image on said display apparatus in real time; and
a switching mechanism configured to cause said display apparatus to turn on and/or off in response to said switching mechanism, wherein said display screen of said display apparatus automatically turns on when a cover of said sun visor is opened, and the display screen automatically turns off when the cover is closed;
wherein said housing is mounted on a vehicle sun visor and draws electrical power for said first camera, display apparatus, computer processor, said non-volatile computer memory through a wiring harness connected to a hinge system of said sun visor.

17. The automotive audio visual system of claim 16 further comprising:
a second camera positioned on said second side of said housing; and
wherein said computer instructions are further configured to:
receive a second image from said second camera, and
display said second image on said display apparatus in real time.

18. The automotive audio visual system of claim 16 further comprising:
a second camera positioned elsewhere in or on said vehicle,
an external camera interface to interface with said second camera, and
wherein said computer instructions are further configured to:
receive a second image from said second camera, and
display said second image on said display apparatus in real time.

19. The automotive audio visual system of claim 16 wherein said first camera is configured to capture a polarized first image.

20. The automotive audio visual system of claim 16, further comprising a rechargeable battery disposed in said housing,
wherein said housing is configured to be detachable from said vehicle sun visor,
wherein said camera, said display apparatus, said computer processor, and said non-volatile computer memory are powered by said rechargeable battery when said housing is detached from said vehicle sun visor.

21. An automotive visual system for monitoring traffic signals, road signs, and such from a motor vehicle, said visual system comprising:
a vehicle having a windshield and a sun visor;
a display apparatus comprising a display screen on one side thereof and a camera on the opposite side,
wherein said display apparatus is mounted on said sun visor positioned behind said windshield, such that when said sun visor is deployed the display screen of said display apparatus faces toward a user of the sun visor and an aperture of said camera faces toward the front of said vehicle so as to capture a view of the area in front of said vehicle,
wherein said display screen automatically turns on when a cover of said sun visor is opened, and the display screen automatically turns off when the cover is closed, wherein said display apparatus draws electrical power through a wiring harness connected to a hinge system of said sun visor.

22. The automotive visual system of claim 21 further comprising:
a head up display,
wherein a still image and/or video captured by said camera is a view of the area in front of the vehicle displayed on said head up display.

23. The automotive visual system of claim 21, further comprising a rechargeable battery,
wherein said display apparatus is configured to be detachable from said vehicle sun visor, and is powered by said rechargeable battery when said display apparatus is detached from said vehicle sun visor.

24. An automotive audio visual system comprising:
a sun visor;
a display apparatus installed on said sun visor such that when said sun visor is deployed, said display apparatus faces a user of said sun visor, said display apparatus comprising a display screen and at least one camera;
wherein an aperture of said at least one camera is configured to face the user of said sun visor at least when said sun visor is deployed;
non-volatile computer memory storing computer instructions configured to:
receive an image from said camera when said sun visor is deployed,
display said image on said display apparatus in real time, wherein said image is a reflection of the user comprising still image data or video image data which can be stored in said memory and transferred to another device;
wherein said display screen automatically turns on when a cover of said sun visor is opened, and the display screen automatically turns off when the sun visor cover is closed.

25. The automotive audio visual system of claim 24, wherein said computer instructions are further configured to:
store images and/or videos captured by said camera in response to user input.

26. The automotive audio visual system of claim 24, further comprising one or more rear cameras placed in a position that faces a rear passenger seat of the vehicle, and
wherein said display apparatus is configured to display a rear view produced by said one or more rear cameras, in response to user input.

27. The automotive audio visual system of claim 24, wherein said display apparatus is configured to be detachable from said vehicle sun visor.

28. The automotive audio visual system of claim 24, wherein said display screen comprises touch screen controls which include an auto share option for automatically uploading and sharing still or video images received from said at least one camera.

* * * * *